Oct. 29, 1963 K. E. LANGE ETAL 3,108,710
FOOD CAN OF SYNTHETIC MATERIAL
Filed June 10, 1958 3 Sheets-Sheet 1
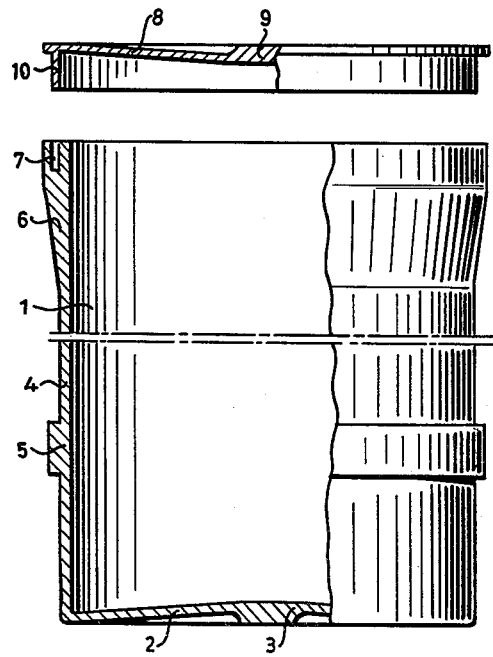
Fig.1
Fig.3
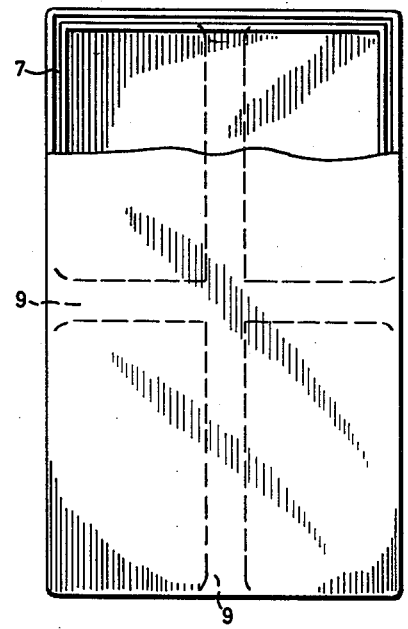
Fig.2
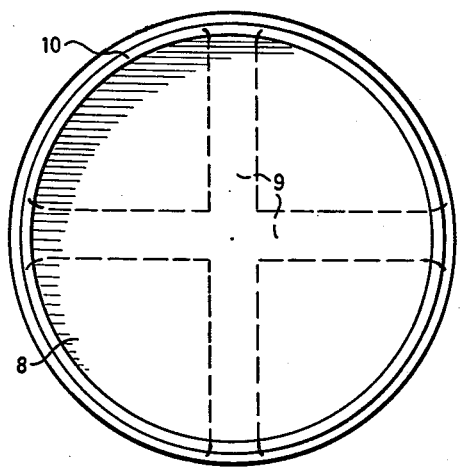
Fig.4
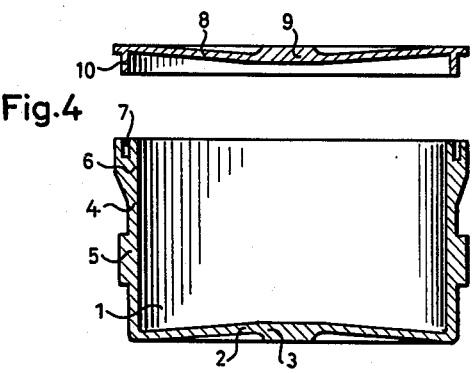
INVENTORS
KARL ERWIN LANGE
GEORG FRANZ LUKOWSKI
BY Dick and Craig
ATTORNEYS Oct. 29, 1963 K. E. LANGE ETAL 3,108,710
FOOD CAN OF SYNTHETIC MATERIAL
Filed June 10, 1958 3 Sheets-Sheet 2

INVENTORS
KARL ERWIN LANGE
GEORG FRANZ LUKOWSKI
BY *Dicke and Craig*
ATTORNEYS

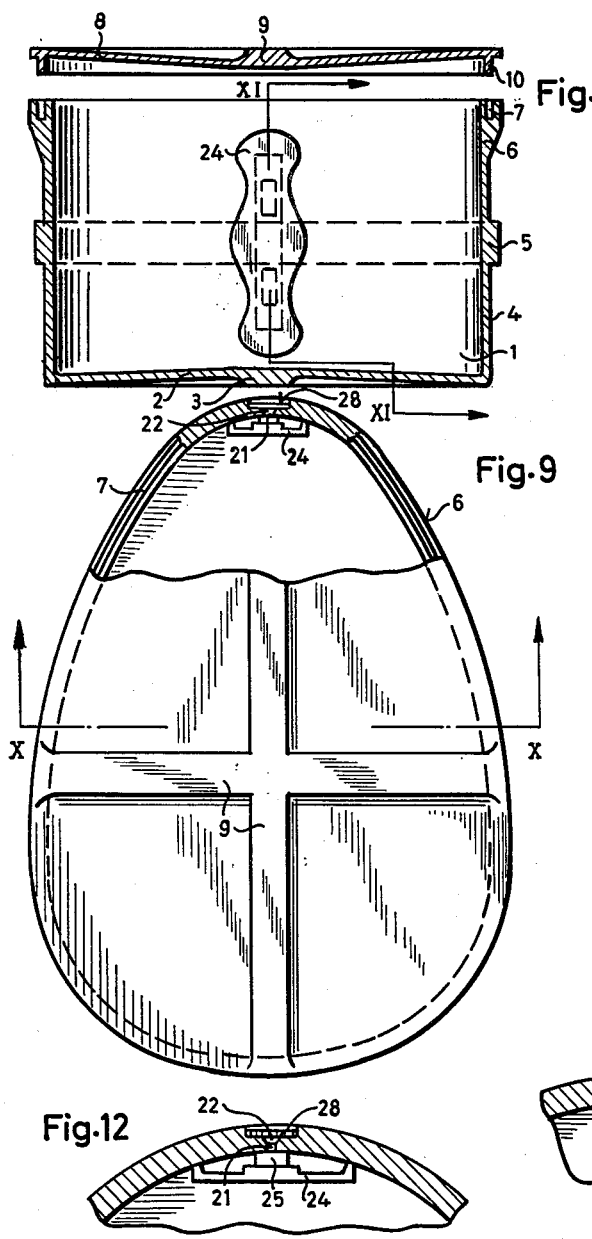

United States Patent Office 3,108,710
Patented Oct. 29, 1963

3,108,710
FOOD CAN OF SYNTHETIC MATERIAL
Karl Erwin Lange, Schlachthausstrasse 10c, Karlsruhe, Germany, and Georg Franz Lukowski, Michelsbergstrasse 2a, Bruchsal, Germany
Filed June 10, 1958, Ser. No. 741,090
Claims priority, application Germany June 11, 1957
3 Claims. (Cl. 220—67)

The present invention relates to a preserving can which consists entirely of a chemically and thermally highly stable synthetic material, and which is sealed by fusing or cementing together the edges of the component parts, namely of the container and its lid.

The modern food industry has a very high demand for preserving cans for food of all kinds, such as meat, fish, vegetables, fruit, milk, cooked foods and the like. By far the greatest majority of containers for preserved food consists of tin plate, which may be varnished internally if required. Beside this, only small quantities of glass jars are used commercially, particularly for fish preserves, and for this purpose these jars have a specially prepared lid, which grips the rim of the glass jar by using an intermediate layer of rubber packing. To a very small extent, cans are also made of synthetic material with a push-in circular lid for chemically preserved goods.

The above-mentioned cans made of synthetic material always consist of a thin-walled material, and the lid and container usually do not fit each other tightly. Consequently, cans of this type cannot withstand mechanical stresses of any sort. Of course, the same also applies to glass jars which can only be transported and stored with the greatest precaution.

Although the conventional tin cans have the stability necessary to stand rougher handling, their production requires a series of costly processes since the tin sheet casing itself has to be soldered to attain a tight seam, and the finished tin casing also has to be soldered to its bottom which may previously have to be flanged thereon. After filling the preserving cans and closing them by flanging the lid thereon, it is necessary for many types of food to solder the lid to the container, in order to ensure that the desired quality of the food will be maintained. However, in spite of all precautions, the quality of the food which is preserved in tin cans can be guaranteed for only about 3 years. This fact, however, is very disadvantageous, especially for food items which are to be stored for longer indetermined periods since, apart from the loss through spoilage, they require a constant inspection in order to ascertain their condition.

It must further be considered that all food cans made from tin require rubber rings on their bottoms and lids, which are clamped into the beading during the flanging process. Thus, two different materials have to be inspected and tested in order to determine whether their properties comply with the requirements of the canning industry. Finally, it is also known that some food items preserved in tin cans must, because of the lack of complete air-tightness, be stacked in storage according to a special system so that the individual cans will be separated from each other by gaps.

It is an object of the invention to provide a preserving can which overcomes the above-mentioned disadvantages of the known preserving cans by the use of a single suitable uniform material for the entire can, and by providing it in a structural shape which best complies with the properties of the material and to requirements of the preserving process. This object of the invention is achieved by providing a preserving can, the individual parts of which, namely, the container and lid, consist of a chemically, thermally and mechanically highly stable and elastically tough synthetic material capable of withstanding temperatures in the order of 80 to 126° C., as, for example, polyolefins, preferably low-pressure polyolefins, and which are sealed by fusing or cementing together the rims of the container and the lid. For this purpose, the present invention proposes that the rims of the container and the lid be provided with reciprocal tongue and groove indentations, so as to permit them to be fused or cemented together without any gaps or seams during the sealing process.

The reciprocal tongue and groove indentation of the container and the lid results in various very important advantages. By fitting the lid directly upon the container as soon as it has been filled, the tongue and groove connection first of all prevents the rim of the container from being soiled by its contents during the subsequent operations thereon. Furthermore, in the event that an adhesive is being used for sealing the container, this formation of the rim prevents the adhesive from penetrating into the container itself so that the contents will not be contaminated. Numerous tests have also shown that even though such cans might have been inadequately sealed by fusing or cementing, they will still remain airtight, so that their contents can be used for a long time.

The use of preserving cans made of a synthetic material having the properties and characteristics mentioned has further a series of marked advantages. As compared to preserving cans made of tin-plate, a series of working processes can be dispensed with during their manufacture, since the container casings which are made of synthetic material may be produced without seams by spraying, pressing, drawing, or by an injection or extrusion process, and do not require any subsequent treatment, such as varnishing, soldering of the bottom and casing and the like. Several further advantages are apparent in their use. Storage is simplified since similar cans can be used for any desired type of food. Furthermore, the operation of sealing the cans is considerably simplified and may be carried out within a much shorter time than required for sealing tin cans.

According to the invention, the inner wall of the casing of the can is preferably made completely smooth, without any ridges, depressions, and seams, and without any constriction of the diameter between the bottom of the can and the upper rim. This has the advantage that cans filled with solid substances can be emptied easily and completely. The opening of such a can made of synthetic material according to the invention can be effected without any additional special tools, and merely by piercing the rim of the bottom or lid with a simple knife and then cutting it off along the edge.

The can made from synthetic material according to the invention may be made of a wall thickness of about 1 mm. or less. According to a preferred embodiment of the invention, the bottom and lid may be drawn slightly inwardly from the rim toward the center in the direction toward the inside space, in which they may be provided with one or more transverse reinforcing ridges which end flush with the rim of the lid and/or bottom of the container.

This measure has the advantage that sealed cans of this type can be treated during the preserving process without equalizing the inner and outer pressures. This enables the bottom and lid, as a consequence of their shape and reinforcement, to withstand the inner pressure to be expected without any marked deformation. Furthermore, the invention provides that in the case of larger cans and depending upon their size, the casing be provided with one or more circular reinforcing ridges. These reinforcing ridges are designed so as to end flush with the rim of the container and the lid which, if desired, may also be reinforced toward the outside.

The inner edges of the bottom and lid, which abut against the casing of the can are preferably also slightly reinforced. The can thereby acquires at the contact edges, which are of themselves more fragile, an increased resistance to mechanical stresses during transport and storage. It is known that cans made from tin-plate become very easily slightly indented at their edges when dropped, and that they must then be discarded from the stock because of the danger that the flanged and soldered seams might open up or leak. This disadvantage is avoided by the use of cans which are made from a tough elastic synthetic material, and which have an additional reinforcement of its edge portions.

The formation of the edge portions of the cans for attaining an adequate tongue and groove connection can be effected in various ways. A preferred embodiment of the reciprocal indentation of the rim of the container and its lid which is applicable to all cross-sectional shapes consists of an edge portion which is reinforced toward the upper rim of the container, and of a circular groove which extends from the rim surface in an axial direction. The corresponding lid is then provided on its lower surface and at a suitable distance from its outer edge with a circular tongue, which fits firmly into the groove when the lid is placed on the container.

In general, in this embodiment of the invention, the groove and tongue will be made of a rectangular cross-section. However, in order to obtain complete air-tightness merely by fitting the lid upon the container without fusing or cementing it thereto, it may be expedient to make the circular tongue on the inner surface of the lid of a frusto-conical cross-sectional shape. The surface of the tongue facing toward the inner surface of the lid may then be vertical, while the outer surface thereof may extend at an obtuse angle, or vice versa.

In the embodiments of the invention as above described in which the container and the lid are provided with a tongue and groove, the rim portion of the container is preferably reinforced toward the outside so as to give the open container an increased stability. The continuous circular reinforcing ridges on the outside of the container casing are preferably made so as to be flush, that is to say, in the same plane, with the reinforced rim, and it is advisable to avoid any other protruding parts in order to economize in transport and storage space. The precaution that the reinforcing ridges at the bottom and lid should end within the same plane as the rims of the latter enables the individual closed cans to be stacked directly on top of each other, contrary to the usual preserving cans made from tin, which always have a ridge protruding from the top or bottom surface.

The actual sealing of the can, namely, the secure connection of the rims of the container and the lid, can be effected by fusing, for example, by means of the high frequency fusing process, or by cementing. For the fusing process, it is advantageous to provide both parts of the can, namely, the container and the lid, with thin horizontal, externally projecting, circumferential rim-ridges, so-called fusing lips. The projecting fusing lips on the container and lid permit the electrodes, for example, ring-shaped electrodes, to be applied without difficulty, not only on the upper side of the lid, but also on the lower side of the rim of the container, in order to fuse the rim portions of both parts of the can solidly together.

For cementing the container and the lid to each other, the interengaging parts of the rims, that is, for example, only the outer surfaces of the tongue and the groove, or only the tongue, are coated with the cement to be used before the lid is placed upon the container. The lid is then pressed into position, whereupon the closed can is subjected to the necessary further operations. The type of cement must be chosen in accordance with the required adhesive properties thereof with respect to the synthetic material of the can used, and its harmlessness to the contents of the can and their subsequent use. The cement to be used preferably should consist of a solution of the same synthetic material of which the can itself is made, mixed with a non-toxic solvent which is not detrimental to either taste or smell. In many cases it will be possible to use a watery emulsion for this purpose. When using a solution of the same synthetic material as that of the can, the parts of the can which might possibly come into contact with the cement will slightly swell up or dissolve, which ensures an adhesion which is absolutely secure and free from any gaps or seams. This, in conjunction with the fact that the casing of the can itself does not possess any seams, ensures a completely airtight, liquid- and odor-proof closure.

The type of synthetic material to be chosen for the manufacture of the cans depends upon the requirements of the respective preserving industry. The present stage in the development of synthetic materials easily allows a suitable selection of a synthetic material which complies with the various requirements regarding mechanical, thermal and chemical properties. The synthetic material must, of course, be completely chemically resistant against organic acids, salts, proteins and fats; furthermore, it must be resistant to breakage and impacts, and it must have adequate stability at fairly high and low temperatures. Primarily, however, it is necessary that the chemical stability will be retained at fairly high temperatures, even those exceeding the maximum temperature of 121° C. which is usually required by the preserving industry. Polyolefin synthetic materials, in particular low-pressure polyolefins, appear particularly suitable for this purpose.

Further objects, features, and advantages of the present invention will become evident from the following detailed description thereof, particularly when read with reference to the accompanying drawings of several different embodiments of the invention, in which—

FIGURE 1 shows a side view, partly in cross section of a container and lid of a round can according to a preferred embodiment of the invention;

FIGURE 2 shows a plan view of the lower side of the lid according to FIGURE 1;

FIGURE 3 shows a top plan view, partly in cross section of a square can in the same form of the embodiment as shown in FIGURES 1 and 2;

FIGURE 4 shows the same square can, but with its lid seen in vertical section;

FIGURE 9 shows a plan view, partly in cross section, of a pear-shaped ham can with an arrangement for the evacuation of air during the preserving process;

FIGURE 10 shows a cross-section taken along line X—X of FIGURE 9;

FIGURE 11 shows a cross section taken along line XI—XI of FIGURE 10;

FIGURES 12–13 show partial cross sections of the pointed end of the pear-shaped preserving can according to FIGURES 9 to 11; while FIGURE 14 shows a detail of the pear-shaped preserving can according to FIGURES 9 to 11.

Figure 5:
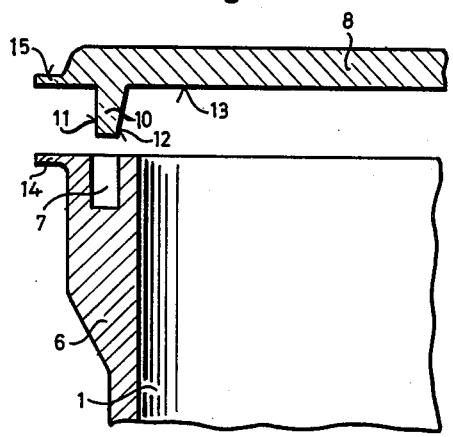
FIGURE 5 shows a cross section of a can according to a modification of the invention with protruding rims as welding lips.

The round can according to the invention, as illustrated in FIGURES 1 and 2, is made from a mechanically, thermally, and chemically highly stable synthetic material, and consists of the container 1 of a circular cross section, which is smooth internally without any upward constrictions and without projections on the inner surface, and also without any seams. This container shows externally at the bottom 2, which is drawn slightly inwardly, a transverse reinforcing ridge 3, and on the casing 4, a circular reinforcing ridge 5, as well as a reinforcement 6 of the upper rim. A circular groove 7 is provided in the upper rim. The lid 8, also drawn slightly inwardly, has reinforcing ridges 9, and fits with its corresponding circular tongue 10 into the circular groove 7 of the container.

The square can, as illustrated in FIGURES 3 and 4, has the same characteristics as the round can of FIGURES 1 and 2, and the same reference numbers have been used therein. Therefore, no further description is needed.

Figure 6:
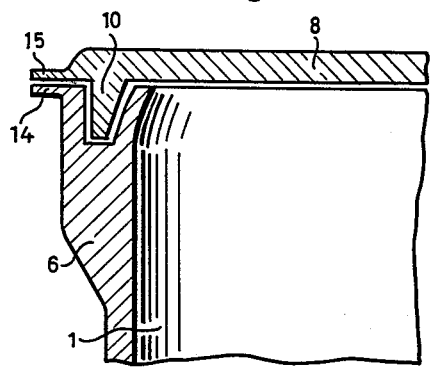
FIGURE 6 shows the container and lid according to FIGURE 5 fitted together.

The modification of the invention as shown in FIGURES 5 and 6 shows a few additional features. The container 1 has likewise a reinforced upper rim 6 with a groove 7, and the lid 8 has a corresponding tongue 10 which has, however, a frusto-conical cross section. In this arrangement, the outer surface 11 of the tongue and groove is vertical to the inner surface 13 thereof, and the inner surface 12 is at an obtuse angle thereto. The upper rims of the container and the lid are each provided with a continuous circular rim ridge 14 and 15, respectively, projecting horizontally in the outward direction. These ridges serve the purpose of fusing lips at which the two parts may be fused together. As shown in FIGURE 6, when the lid is being placed on the container, groove 7 will be pushed apart so that a particularly good airtightness will thereby be attained.

Figure 7:
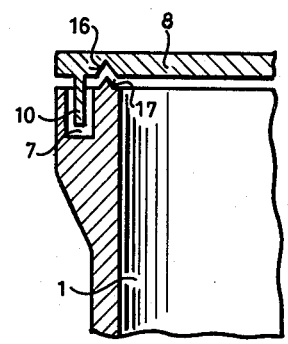
FIGURES 7–8 show cross-sectional views of two further modifications of the invention.
Figure 8:
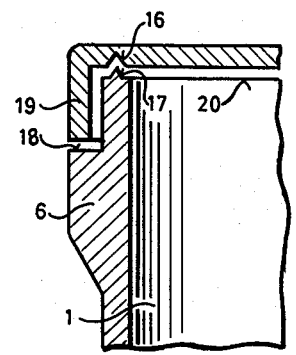

FIGURE 7 shows a modification of the arrangement of the rims of the container and lid as shown in FIGURES 1 to 6, in that the rim 6 of the container 1 is additionally equipped on the inside with a tongue 17 which fits into the groove 16. A similar arrangement is shown in FIGURE 8, in which the vertical wall of the container is cut away from the outside toward the inside of the upper rim 6, whereby a bearing surface 18 is formed for the circular rim ridge 19 of the lid 8, the latter projecting beyond the container and fitting with a corresponding bearing surface upon the above bearing surface 18. Ridge 17 is additionally fitted upon the inner upper rim 20 of the container, and interengages with the corresponding groove 16 of the lid 8.

The provision of an additional, preferably acute-angled tongue and groove formation, as shown in the embodiment according to FIGURE 7, represents a further device for properly sealing the food to be preserved in the can according to the invention. This arrangement is of particular advantage when a liquid cement is used for sealing. For this purpose, only the outer surfaces of the rims of the container and lid are provided with the cement, and the lid is then fitted upon the container. The acute-angled tongue and groove formation as shown in FIGURES 7 and 8, definitely prevents the penetration of portions of the cement into the inside of the can.

The pear-shaped can for ham, shown in detail in FIGURES 9 to 14, and consisting of a container 1 and lid 8, also has the tongue and groove formation of the rims of the container and lid. It further contains some of the features described with respect to the above-mentioned embodiments of the invention, consisting of a circular groove 7 extending within the upper reinforced rim 6 of the container, and of a circular ridge 10 extending around the circumference of the lid, the latter interengaging with the groove 7 when the can is closed. The bottom 2 of the container and the lid 8, similarly to the embodiments of the invention already described, are drawn slightly inwardly toward their center, and are provided with reinforcing ridges 3 and 9, respectively, which end flush with the rims of the bottom and/or the lid. The can shown in FIGURES 9 to 14 further shows a device for evacuating the air from the can. For this purpose, the casing of the can is provided with an aperture 21 at the pointed end of the pear-shaped circumference in the region of the reinforcing ridge 5. This aperture extends into a conical enlargement 22, and then into a square enlargement 23, as seen from above. An insert 24 with spacers 25 made of one piece, as shown in FIGURE 14, is cemented to the inside of the casing, and consists of the same synthetic material as that of the can. This insert ensures that the opening for evacuating the filled can will not be clogged by the contents of the can, but will remain open. After filling and sealing the can, the insert 25 will during the evacuation process be pressed tightly from all sides against the walls of the can and rest thereon by means of the projections 26. Angular openings are thereby provided between the projections 26, the walls of the can and the flat part of the insertion 27, which allow the passage of air and/or vapors from the can. After the evacuation has been completed, the aperture 21 will first be sealed under a vacuum by fusing it shut by means of a fusing rod of the same synthetic material (FIGURE 13). Following this, the final air-tight sealing can be effected by cementing plate 28 of synthetic material so as to fit tightly into the enlargement 23.

The can as illustrated in FIGURES 9 to 14 may, if desired, also be provided with the additional features described with respect to the other embodiments of the invention. Furthermore, the device for evacuating the can can also be mounted on any other desired place, as, for example, on the lid or bottom.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. A preserving can for food and the like comprising a container and a lid, said container and said lid each having a rim portion consisting of a synthetic plastic material capable of withstanding heat treatment at temperatures in the order of 80 to 126° C., said material being chemically inert to foods and the like and mechanically stable with respect to strains imposed during said heat treatment and during handling of said can, said rim portion of said lid including a depending annular tongue member, said tongue member having an outer surface and an inner surface, one of said two last-mentioned surfaces being an essentially cylindrical surface extending essentially perpendicularly to said lid, and the other of said two last-mentioned surfaces extending at an obtuse angle to said lid forming an essentially frusto-conical surface, said rim portion of said container being provided with an upwardly opening cooperating annular groove receiving said tongue member, said groove having sides thereof defined by spaced essentially cylindrical wall surfaces, the width of said tongue member over at least a portion of its length being greater than the width of said groove, whereby said groove is resiliently deformed by said tongue member upon insertion of said tongue member, and means integrally bonding said lid to said container in a continuous circumferential seal.

2. A preserving can as defined in claim 1 wherein the essentially cylindrical surface of said tongue member is the inner surface thereof, and wherein the surface of said tongue member extending at an obtuse angle is the outer surface thereof.

3. A preserving can as defined in claim 1, wherein said means integrally bonding said lid to said container include cooperating annular fusing lip portions on said container and on said lid.

References Cited in the file of this patent

UNITED STATES PATENTS

| | | |
|---|---|---|
| 1,128,076 | Taliaferro | Feb. 9, 1915 |
| 1,247,029 | Specht | Nov. 20, 1917 |
| 1,305,702 | Ehlert | June 3, 1919 |
| 1,459,437 | Bowman | June 19, 1923 |
| 1,920,786 | Green | Aug. 1, 1933 |
| 2,343,197 | Makowski | Feb. 29, 1944 |
| 2,695,645 | Tupper | Nov. 30, 1954 |
| 2,773,624 | Knieriem | Dec. 11, 1956 |
| 2,795,348 | Kunik | June 11, 1957 |
| 2,828,789 | Groendyk et al. | Apr. 1, 1958 |
| 2,837,236 | Betner | June 3, 1958 |
| 2,915,214 | Frankel | Dec. 1, 1959 |

FOREIGN PATENTS

| | | |
|---|---|---|
| 871,832 | France | Jan. 22, 1942 |
| 507,048 | Italy | Dec. 28, 1954 |